United States Patent
Chen et al.

(10) Patent No.: US 11,176,907 B2
(45) Date of Patent: Nov. 16, 2021

(54) VIDEO DATA DISPLAYING DEVICE

(71) Applicant: Sitronix Technology Corp., Hsinchu County (TW)

(72) Inventors: Chao-Chyun Chen, Hsinchu County (TW); Chih-Hsiung Lin, Hsinchu County (TW); Shu-Yang Lin, Hsinchu County (TW); Shang-Jen Yang, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 0 days.

(21) Appl. No.: 17/024,728

(22) Filed: Sep. 18, 2020

(65) Prior Publication Data
US 2021/0104205 A1 Apr. 8, 2021

Related U.S. Application Data

(60) Provisional application No. 62/901,810, filed on Sep. 18, 2019.

(51) Int. Cl.
| G09G 3/34 | (2006.01) |
| G09G 5/00 | (2006.01) |
| G09G 5/36 | (2006.01) |
| G09G 5/393 | (2006.01) |
| G09G 5/395 | (2006.01) |

(52) U.S. Cl.
CPC ........... *G09G 5/006* (2013.01); *G09G 3/3466* (2013.01); *G09G 5/363* (2013.01); *G09G 5/393* (2013.01); *G09G 5/395* (2013.01); *G09G 2360/18* (2013.01)

(58) Field of Classification Search
CPC ...... G09G 5/006; G09G 3/3466; G09G 5/363; G09G 5/393; G09G 5/395; G09G 2360/18
See application file for complete search history.

(56) References Cited

U.S. PATENT DOCUMENTS

| 2017/0006336 A1* | 1/2017 | Lee .................... H04N 21/4341 |
| 2018/0199107 A1 | 7/2018 | Kwak |
| 2020/0042264 A1* | 2/2020 | Zheng .................... G09G 5/005 |

FOREIGN PATENT DOCUMENTS

| CN | 105070258 A | 11/2015 |
| CN | 110136644 A | 8/2019 |
| TW | 200414096 | 8/2004 |
| WO | 03/058826 A2 | 7/2003 |

* cited by examiner

*Primary Examiner* — Robert J Michaud
(74) *Attorney, Agent, or Firm* — Winston Hsu

(57) ABSTRACT

The present invention discloses a video data display device including a plurality of driving circuit. Each driving circuit includes a status controller, a data receiver, an output data generation unit, and an output buffer. The status controller couples with the data receiver, the output data generation unit, and the output buffer. The status controller generates a status signal based on the operation information of the data receiver, the output data generation unit, or the output buffer. The status controller transmits the status signal to the status controller of other driving circuits.

14 Claims, 12 Drawing Sheets

VIDEO DATA DISPLAYING DEVICE

CROSS REFERENCE TO RELATED APPLICATION

This application claims the benefit of U.S. Provisional Application No. 62/901,810, filed on Sep. 18, 2019 and incorporated herein by reference.

BACKGROUND OF THE INVENTION

1. Field of the Invention

The present invention relates to a video data display device, and particularly to a device that combines multiple video data sets to display on a display panel.

2. Description of the Prior Art

In general, a display panel only displays the contents of a video data set. When multiple video data sets are input to the display system, but the display system utilizes only one display panel to display, the images of multiple video data sets must be superimposed to form a single display signal source, so that the display system may correctly display the video data on the display panel.

However, the image superimposition is usually executed in the image processor (GPU/Video Processor) or the timing controller (T-CON). Designing related circuits to process multiple video data sets to combine images will inevitably increase the cost of the display system. Moreover, the display system superimposes multiple video data sets to display on a single display panel, which means that the resolution of the display signal is higher, so that the data amount of display signals to be processed by a display panel driving circuit will be higher and will further increase the cost of the driving circuit.

In addition, when any one of the multiple video data sets malfunctions, the process or result of superimposing multiple video data sets to combine the images is prone to have errors, which may cause the display panel to display incorrect image information.

Because of the need to improve the conventional display system, the present invention provides a display device for combining multiple video data sets to display, so as to solve the above-mentioned problems.

SUMMARY OF THE INVENTION

The purpose of the present invention is to provide a video data display device. The video data display device includes a plurality of driving circuits respectively receiving multiple video data sets and driving a display panel to display images, wherein the plurality of driving circuits video data are required to superimpose multiple video data sets for driving the display panel to display images of multiple video data sets, to effectively reduce the cost of the display system. Moreover, the driving circuits are coupled to a status controller to obtain the operation information of other driving circuits. Therefore, when any driving circuit has an abnormal status, the driving circuits may react synchronously, thereby effectively avoiding all or partial display panel from displaying incorrect image information.

The present invention relates to a video data display device. The video data display device includes a plurality of driving circuits. Each of the driving circuits includes a status controller, a data receiver, an output data generation unit, and an output buffer. The status controller is coupled to the data receiver, the output data generation unit, and the output buffer, wherein the data receiver receives a video data. The output data generation unit is coupled to the data receiver for receiving the video data and generating the display data according to the video data. The output buffer is coupled to the output data generation unit for receiving the display data and generates a driving signal according to the display data. The status controller receives an operation information of the data receiver, the output data generation unit or the output buffer to generate a status signal, and transmits the status signal to the status controller of other driving circuits.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. Manufacturers may refer to a component by different names as one skilled in the art may appreciate. Therefore, components shall be distinguished according to function instead of name. In the following description and claims, the terms "include" and "comprise" are open-ended, and thus should be interpreted to mean "include, but not limited to." Also, the term "couple" is intended to mean either an indirect or direct electrical connection. Accordingly, if one device is coupled to another device, the connection may belong to a direct electrical connection or an indirect electrical connection via other devices and connections.

Figure 1:
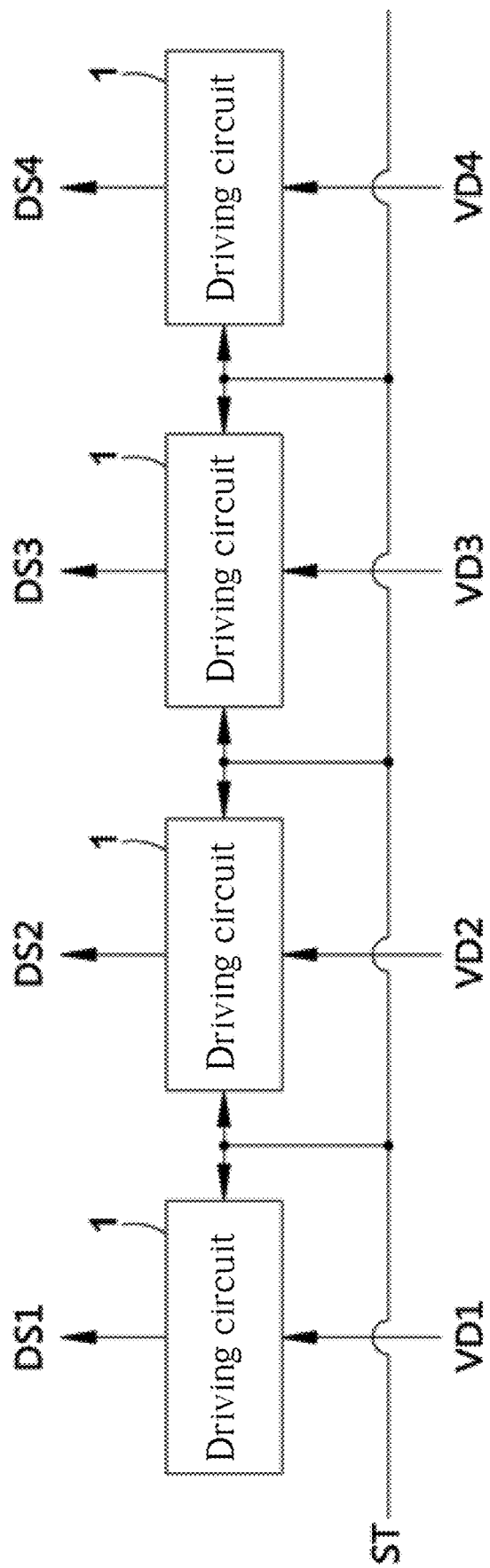
FIG. 1 is a schematic diagram illustrating a video data display device according to a first embodiment of the present invention.

Please refer to FIG. 1. FIG. 1 is a schematic diagram illustrating a video data display device according to a first embodiment of the present invention. As shown in FIG. 1, the video data display device includes a plurality of the driving circuits 1. Each of the driving circuits 1 may receive a video data VD, and generate a driving signal DS required to drive the display panel—for example, the source driving signal is included. As shown in FIG. 1, the embodiment includes four driving circuits 1, and the driving circuits 1 respectively receive four video data sets VD1, VD2, VD3, and VD4, and generate four driving signals DS1, DS2, DS3, and DS4. The video data display device may apply to the display system having a display panel. Each of the driving circuits 1 is respectively coupled to the display panel to drive the display panel to display images.

Figure 2:
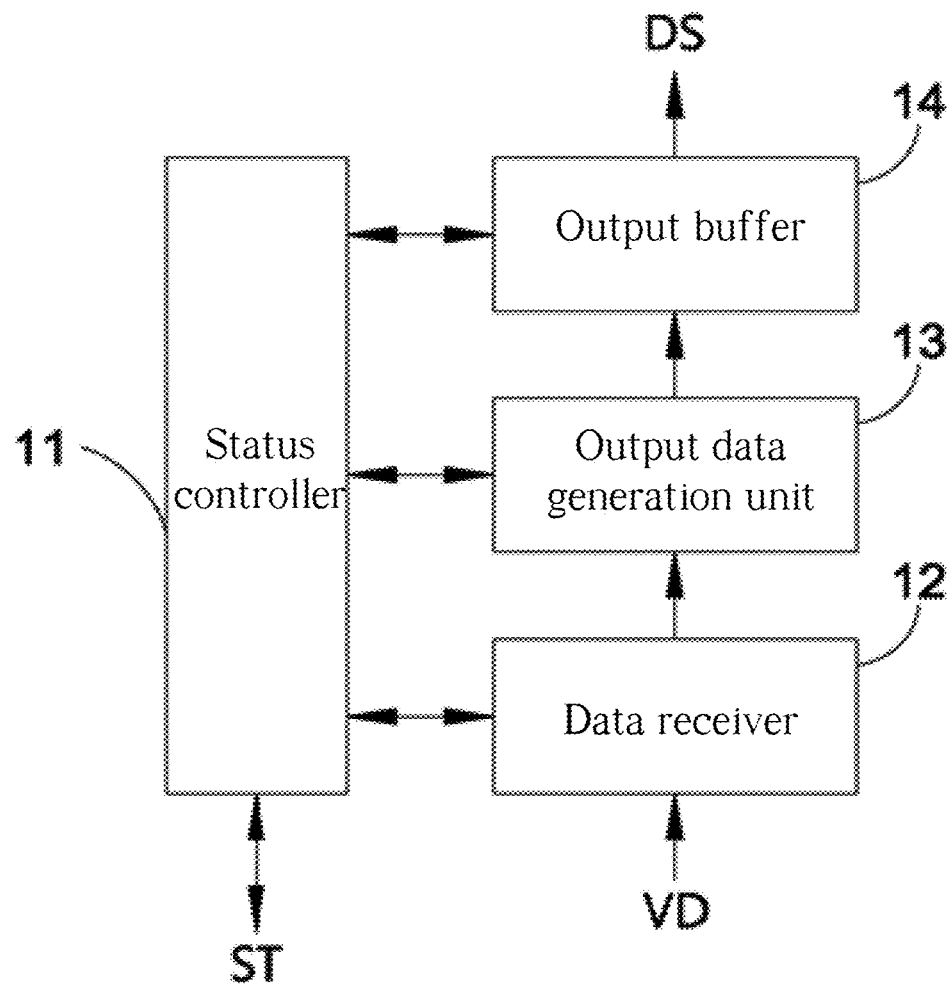
FIG. 2 is a schematic diagram illustrating a driving circuit according to the first embodiment of the present invention.

Please refer to FIG. 2 together. In the embodiment, each of the driving circuits 1 includes a status controller 11, a data receiver 12, an output data generation unit 13, and an output buffer 14.

The status controller 11 is respectively coupled to the data receiver 12, the output data generation unit 13, and the output buffer 14. The data receiver 12 utilizes a video data processor for receiving the video data VD. The data receiver 12 may check the correctness of the video data VD, for example, by executing the Cyclic-Redundancy Check (CRC) to determine whether the data is incorrect, and transmit the check result to the status controller 11. The data receiver 12 may perform format conversion on the interface standard format of the video data VD. For example, if the video data VD originally conforms to the format of high-definition multimedia interface (HDMI), low voltage differential signaling (LVDS/LDI), OpenLDI, or Serial R/G/B, the data receiver 12 may convert the format of the video data VD to RGB format. However, there are many types of interface standard formats, so the interface standard formats of the data receiver 12 before and after converting are not limited to the above examples. In addition, the data receiver 12 may receive commands from the status controller 11 to change the output data.

The output data generation unit 13 is coupled to the data receiver 12 for receiving the video data VD processed by the data receiver 12. The output data generation unit 13 may check the correctness of the video data VD received from the data receiver 12, for example, by executing the Cyclic-Redundancy Check to confirm whether the data is incorrect, and transmit the check result to the status controller 11. The output data generation unit 13 may generate the control signal required to drive the display panel (for example, source timing signal or gate timing signal, and so on.) The output data generation unit 13 may generate the timing signal of input data or output data thereof. The output data generation unit 13 may also generate the status signal representing the operation status thereof and transmit to the status controller 11. The output data generation unit 13 generates the display data to be output to the display panel according to the video data VD. In addition, the data receiver 13 may also receive commands from the status controller 11 to change the output data.

The output buffer 14 is coupled to the output data generation unit 13 for receiving the display data generated by the output data generation unit 13 to be output to the display panel. The output buffer 14 may check the correctness of the data received from the output data generation unit 13, for example, by executing the Cyclic-Redundancy Check to confirm whether the data is incorrect, and transmit the check result to the status controller 11. The output buffer 14 generates the driving signal DS required to drive the display panel according to the data received from the output data generation unit 13. In addition, the output buffer 14 may also receive commands of the status controller 11 to change the output data.

Accordingly, the status controller 11 may receive the operation information of the data receiver 12, the output data generation unit 13, or the output buffer 14, such as the correctness check result of the above-mentioned data. The status controller 11 may also output commands to the data receiver 12, the output data generation unit 13, or the output buffer 14, for controlling the data receiver 12, the output data generation unit 13, or the output buffer 14 to change the output data.

Figure 3:
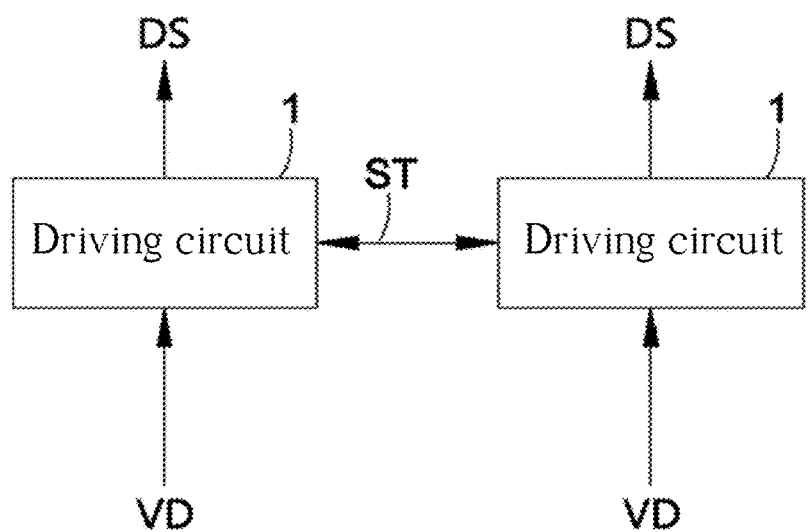
FIG. 3 is a diagram illustrating the serial connection of the driving circuits according to the first embodiment of the present invention.

Please refer to FIG. 3 together. More importantly, in the embodiment, the status controller 11 has a bidirectional transmission interface, such that the status controller 11 may transmit a status signal St to the status controller 11 of other driving circuits 1, or receive the status signal St output by the status controllers 11 of other driving circuits 1. The above-mentioned bidirectional transmission interface may be accomplished by the data bus of I²C or other bidirectional transmission protocols. Therefore, the status controller 11 may not only confirm the operation information of the receiver 12, the output data generation unit 13, or the output buffer 14, which the status controller 11 is coupled to, but also transmit it the operation information to other driving circuits 1, and further check the operation information of the data receiver 12, the output data generation unit 13, or the output buffer 14.

Figure 4:
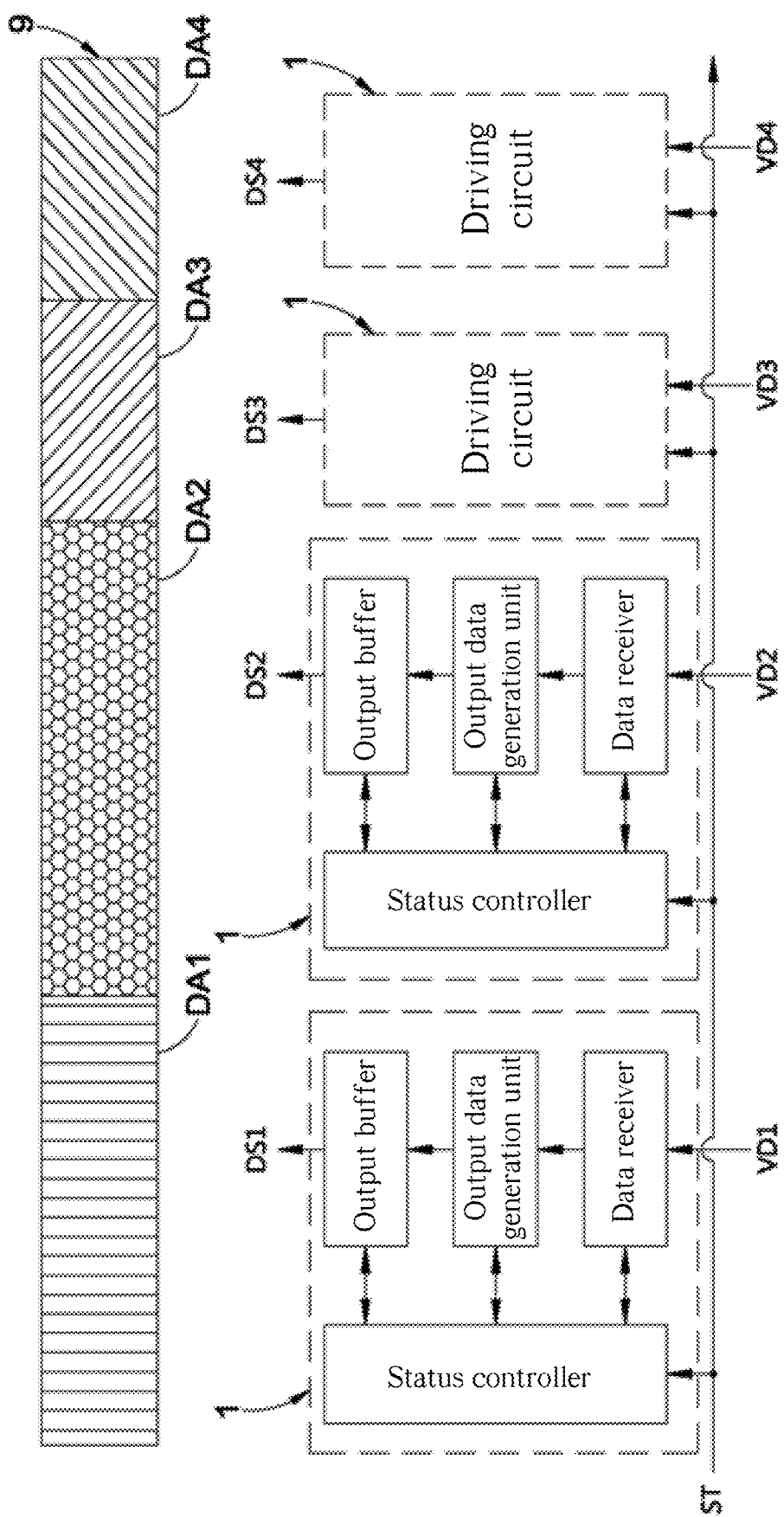
FIG. 4 is a diagram illustrating the operation of the video data display device according to the first embodiment of the present invention.
Figure 5:
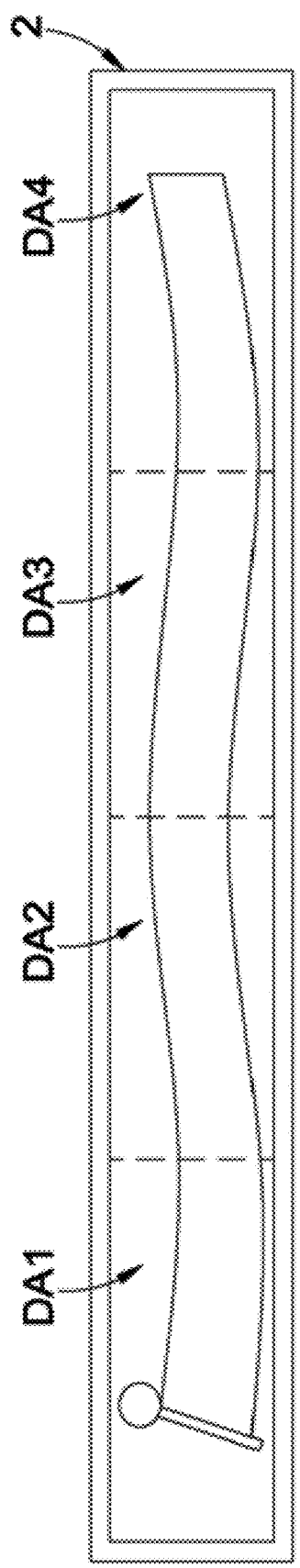
FIG. 5 is a diagram illustrating a display panel driven by the video data display device according to the first embodiment of the present invention.

Please refer to FIG. 4, which is a diagram illustrating the operation of the video data display device according to the first embodiment of the present invention, which is applied to the display system having a display panel 9. The driving circuits 1 respectively receive four video data sets VD1, VD2, VD3, and VD4 through the data receiver 12, and utilize the output data generation unit 13 for generating the display data to be output to the display panel 9 according to the video data VD1, VD2, VD3, and VD4. The four driving signal sets DS1, DS2, DS3, and DS4 are respectively generated through the output buffer 14 for driving the display panel 9 to display images. The four display areas DA1, DA2, DA3, and DA4 of the display panel 9 may be respectively driven by the four driving signal sets DS1, DS2, DS3, and DS4. Therefore, as shown in FIG. 5, the four display areas DA1, DA2, DA3, and DA4 may respectively display images of four video data sets VD1, VD2, VD3, and VD4.

To sum up, compared with the prior art, which relies on the image processor or the timing controller to combine multiple video data sets to display on a display panel, the present invention does not need additional circuits for superimposing multiple video data sets, and directly utilizes a plurality of driving circuits 1 to drive the display panel 9 to display images of multiple video data sets, thereby reducing the cost of the display system effectively. Moreover, since each of the driving circuits 1 receives one video data set instead of the superimposed result of multiple video data sets, the amount of display signal data to be processed by each of the driving circuits 1 may be greatly reduced compared to the prior art. The embodiment of the present invention may also reduce the cost required by the driving circuits 1.

Furthermore, in the prior art, the process or result of superimposing multiple video data sets for combining images is prone to erroneous, which may cause the display panel to display incorrect image information. In comparison, in the embodiment of the present invention, the status controllers 11 included in each of the driving circuits 1 may receive the operation information of the data receiver 12, the output data generation unit 13, or the output buffer 14, and generate the status signals St and connect the status signals St in a series, so that each of the driving circuits 1 may receive the operation information of other driving circuits 1 of the video data display device. Therefore, when any driving circuit 1 has an abnormal status (for example, video/display data is missing, video/display data is erroneous), the driving circuits 1 may react synchronously. For example, the driving circuits 1 are controlled by the status controller 11 controlling the data receiver 12, the output data generation unit 13, or the output buffer 14 to change the output data, such that the driving circuits 1 synchronously output the predetermined driving signal to the display panel 9, and then the display panel 9 displays predetermined information (for example, a black screen or a screen showing the cause of the abnormal status is displayed).

In addition, as above-mentioned, in some embodiments of the present invention, the output data generation unit 13 may also generate a signal representing the operation status thereof and transmit the signal to the status controller 11. The operation status may include operation information such as power-up, standby, power-off, or operation, and so on. Since the embodiment of the present invention enables the status signals St generated by each status controller 11 to be serially connected to each other, each of the driving circuits 1 may utilize the status controller 11 for synchronizing the operation status to ensure that each display area of the display panel driven by different driving circuits 1 can synchronously display, e.g., on, off, or standby at the same time.

Figure 6:
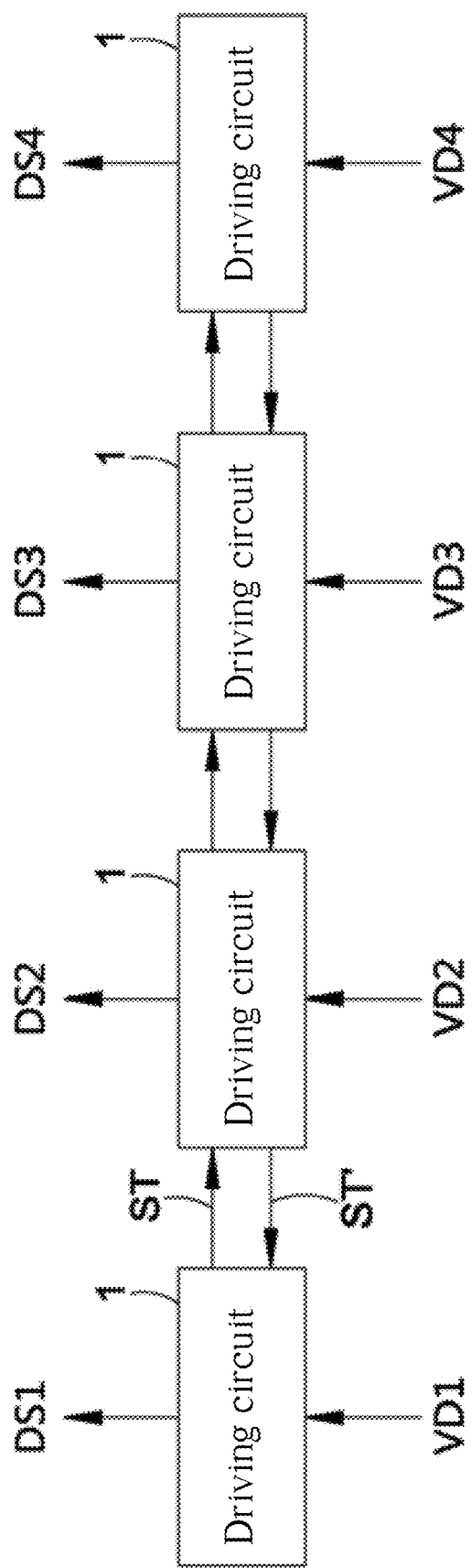
FIG. 6 is a schematic diagram illustrating a video data display device according to a second embodiment of the present invention.
Figure 7:
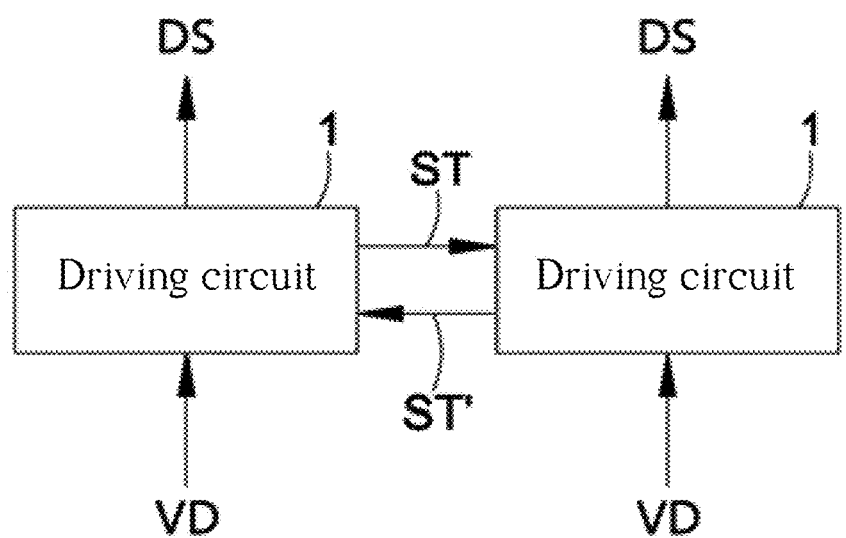
FIG. 7 is a diagram illustrating the serial connection of the driving circuits according to the second embodiment of the present invention.

Please refer to FIG. 6, which is a schematic diagram illustrating a video data display device according to a second embodiment of the present invention. Compared with the above-mentioned first embodiment, the status controller 11 transmits and receives the status signal St through a bidirectional transmission interface. In the embodiment, the status controller 11 may transmit and receive the status signal St through a unidirectional transmission interface. In detail, as shown in FIG. 7, the status controller 11 may transmit a status signal St to the status controllers 11 of other driving circuits 1 through an output interface, and receive the status signal St' output by the status controller 11 of another driving circuit 1 through an input interface. The above-mentioned unidirectional transmission interface may be processed by a Serial Peripheral Interface or other unidirectional transmission protocols.

Figure 8:
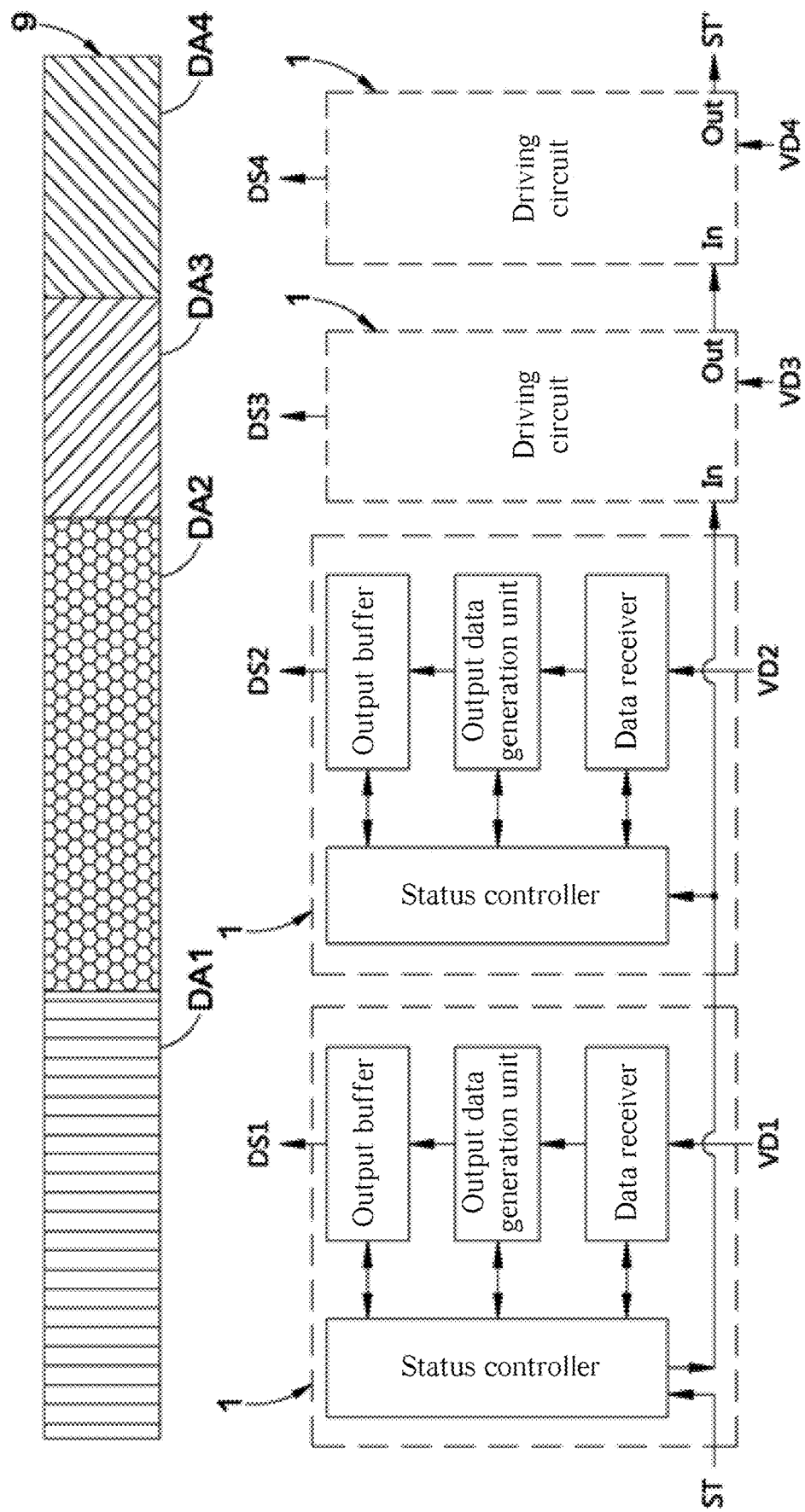
FIG. 8 is a diagram illustrating the operation of the video data display device according to the second embodiment of the present invention.

Please refer to FIG. 8, which is a diagram illustrating the operation of the video data display device according to the second embodiment of the present invention. In the actual operation of the second embodiment, one of the status controllers 11 (for example, the status controller 11 of the driving circuits 1 at the leftmost side of FIG. 8) may be selected as the master control terminal for mutual transmission of the status signal St. At this time, the input interface of the status controller 11 may be floating. However, in other embodiments of the present invention, the status controller 11 of each of the driving circuits 1 may also be serially connected to form a loop, so that the input interface of the status controller 11 of each of the driving circuits 1 receives a status signal St' from other status controllers 11.

Figure 9A:
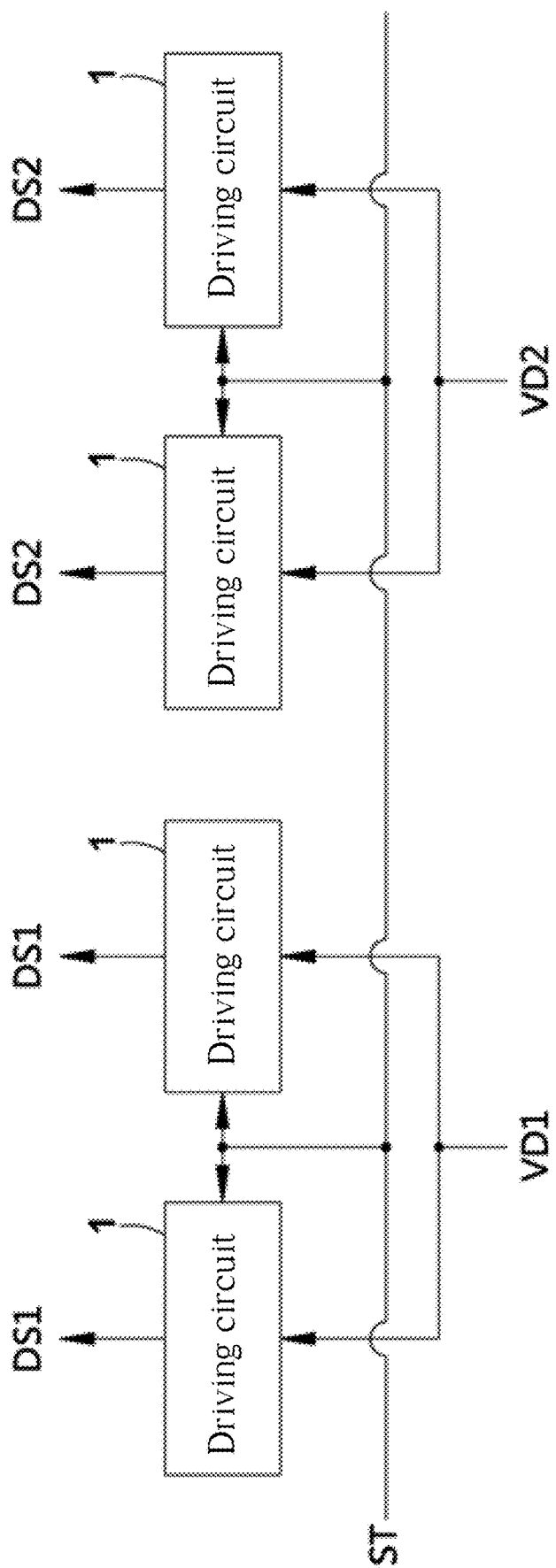
FIG. 9A is a schematic diagram illustrating a video data display device with a bidirectional transmission interface according to an embodiment of the present invention.
Figure 9B:
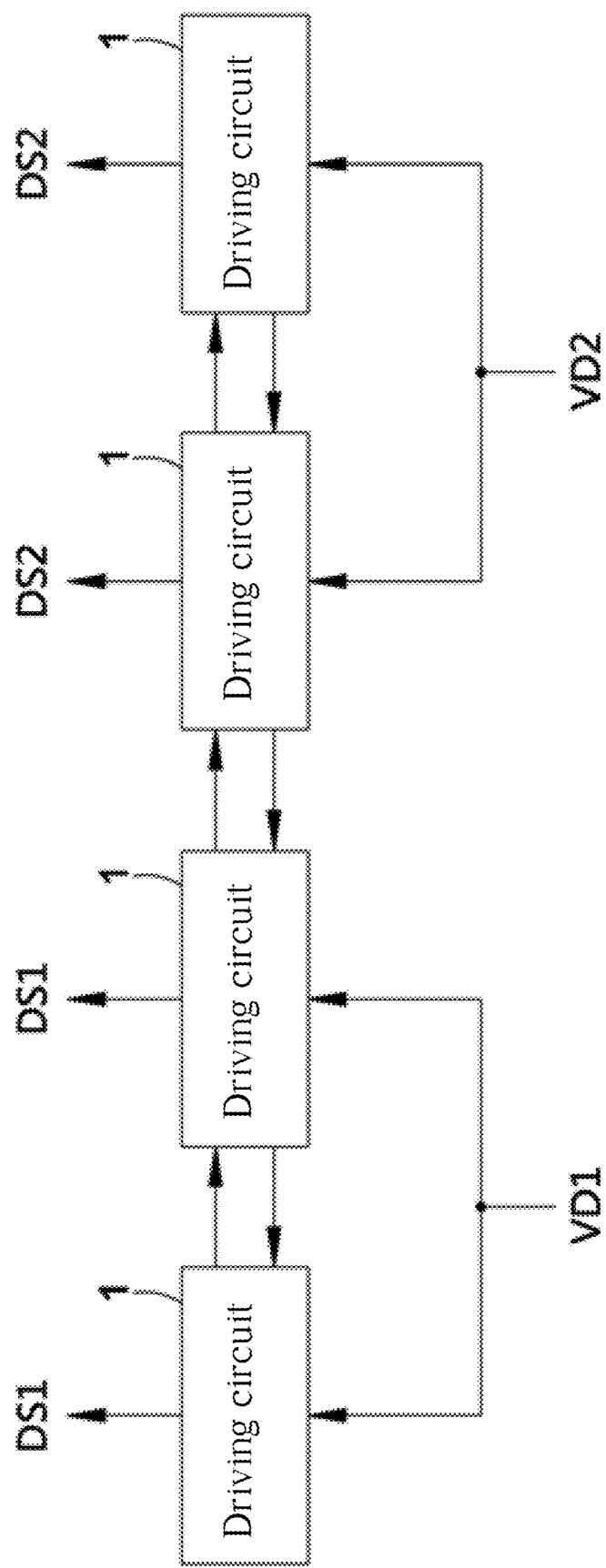
FIG. 9B is a schematic diagram illustrating a video data display device with a unidirectional transmission interface according to an embodiment of the present invention.

In the above-mentioned embodiment, each set of the video data VD is utilized to generate the driving signal DS to the display panel through only one driving circuit 1. However, as shown in FIGS. 9A and 9B, in some embodiments of the present invention, each set of the video data VD1, VD2 may be utilized for generating the driving signal DS1, DS2 by a plurality of the driving circuits 1. At this time, the amount of display signal data to be processed by each of the driving circuits 1 may be further reduced in comparison to the above-mentioned embodiment, so as to reduce the cost of driving circuits 1. The embodiment shown in FIG. 9A utilizes the status controller 11 with the bidirectional transmission interface, and the embodiment shown in FIG. 9B utilizes the status controller 11 with the unidirectional transmission interface.

Figure 10:
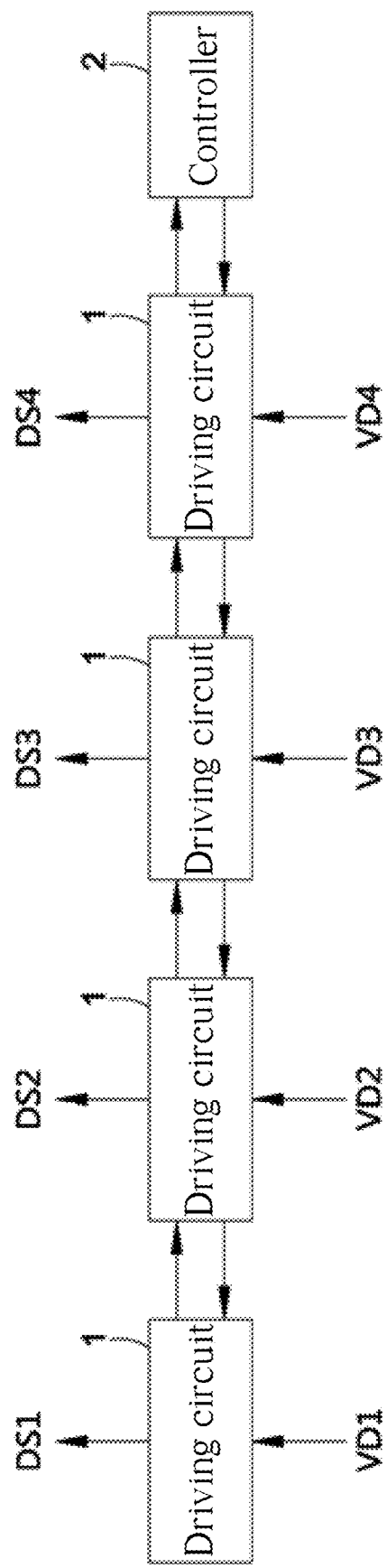
FIG. 10 is a schematic diagram illustrating a video data display device according to a third embodiment of the present invention.

In the above-mentioned embodiments, the driving circuits 1 exchange operation information thereof to each other through the status controllers 11, so as to control the operations of the data receiver 12, the output data generation unit 13, or the output buffer 14. Moreover, please refer to FIG. 10, which is a schematic diagram illustrating a video data display device according to a third embodiment of the present invention. The video data display device of the embodiment further includes a controller 2. The controller 2 is coupled to the status controller 11 of each of the driving circuits 1. Accordingly, the status signals St generated by the status controllers 11 may be received by the controller 2 and then respectively output to the status controllers 11 of each of the driving circuits 1. The controller 2 may perform integrated processing, information retrieval, or format conversion on the status signals St to simplify the circuit complexity of the status controller 11. Furthermore, the status controller 11 may output commands to the data receiver 12, the output data generation unit 13, or the output buffer 14, and the commands may also be generated by the controller 2.

Figure 11:
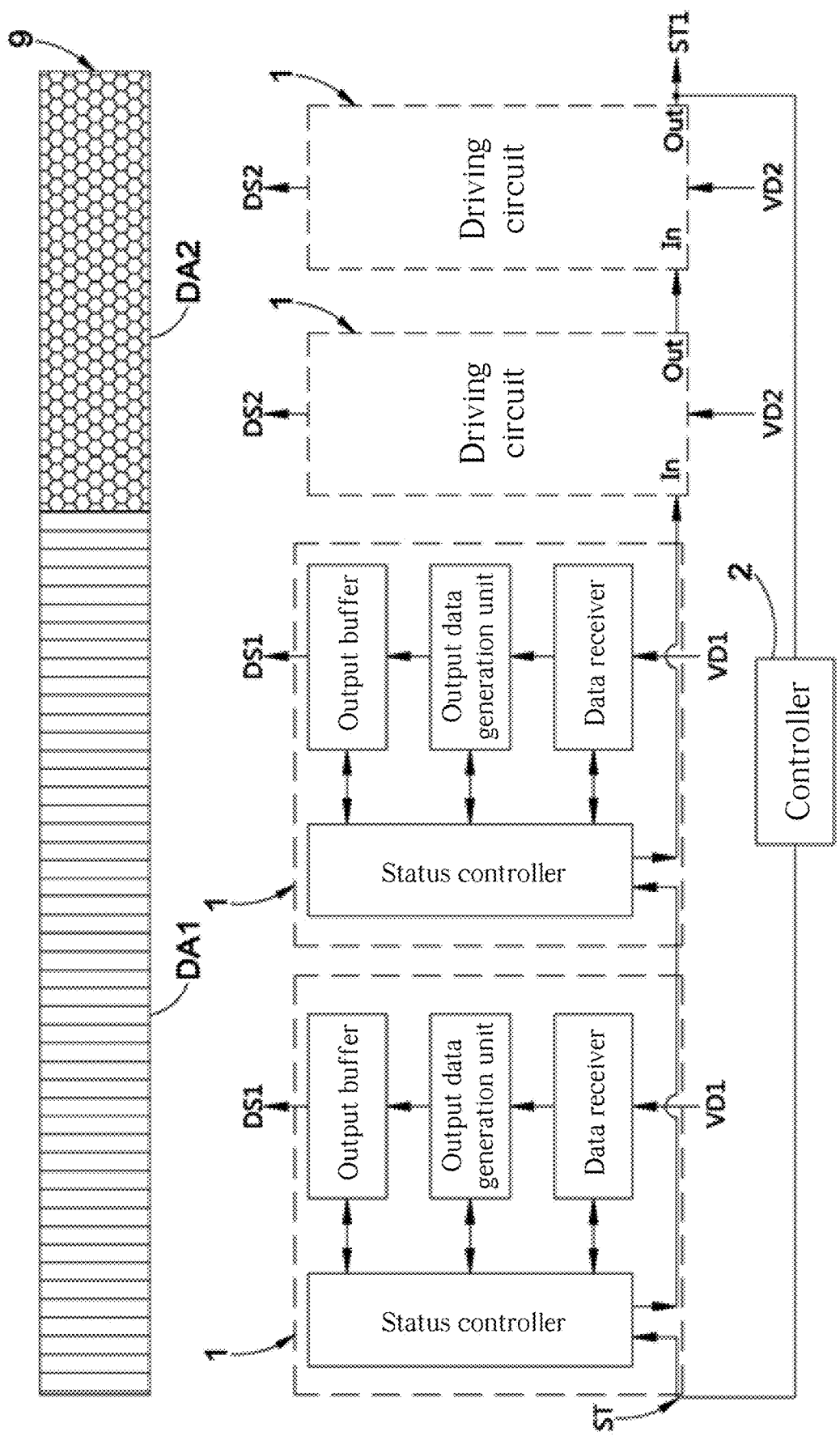
FIG. 11 is a diagram illustrating the operation of the video data display device according to the third embodiment of the present invention.

Please refer to FIG. 11, which is a diagram illustrating the operation of the video data display device according to the third embodiment of the present invention. In FIG. 11, each set of the video data VD1, VD2 is utilized for generating the driving signal DS1, DS2 through two of the driving circuits 1. The status signals St generated by the status controller 11 of each of the driving circuits 1 are received by the controller 2. The controller 2 then outputs the generated status signal St' to each of the status controllers 11.

To sum up, by implementing the video data display device of the present invention, there is no need to superimpose multiple video data sets, while the present invention utilizes a plurality of the driving circuits for driving the display panel to display multiple video data sets, which effectively reduces the cost of the display system, and at the same time, streamline the amount of the display signal data to be processed by each of the driving circuits, so as to lower the individual cost of the driving circuits. Furthermore, the driving circuits are serially connected through the status controller to obtain the operation information of other driving circuits. Therefore, when any one of the driving circuits has an abnormal state, the driving circuits may react synchronously, and effectively avoid the display panel to display incorrect image information in whole or in part.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video data display device, comprising:
   a plurality of driving circuits, wherein each of the driving circuits comprises a status controller, a data receiver, an output data generation unit, and an output buffer, and the status controller is coupled to the data receiver, the output data generation unit, and the output buffer;
   wherein the data receiver receives a video data;
   the status controller is coupled to the data receiver for receiving the video data and generating a display data according to the video data;
   the output buffer is coupled to the output data generation unit for receiving the display data and generating a driving signal according to the display data; and
   the status controller receives an operation information of the data receiver, the output data generation unit or the output buffer, to generate a status signal, and transmits the status signal to status controllers of other driving circuits.

2. The video data display device of claim 1, wherein the data receiver, the output data generation unit or the output buffer checks whether the received data is missing or erroneous, and transmits a check result to the status controller for generating the status signal.

3. The video data display device of claim 1, wherein the data receiver, the output data generation unit or the output buffer executes a cyclic redundancy check to check whether the received data is erroneous.

4. The video data display device of claim 1, wherein the status controller outputs a command to the data receiver, the output data generation unit or the output buffer.

5. The video data display device of claim 4, wherein the data receiver, the output data generation unit or the output buffer changes the output data according to the command.

6. The video data display device of claim 1, wherein the status controller has a bidirectional transmission interface for transmitting the status signal to the status controller of other driving circuits or receiving the status signal output by the status controller of other driving circuits.

7. The video data display device of claim 1, wherein the status controller has an output interface and an input interface for transmitting the status signal to the status controller of other driving circuits through the output interface and receiving the status signal output from the status controller of other driving circuits through the input interface.

8. The video data display device of claim 1, wherein the driving signals generated by the output buffer of each of the driving circuits are used for driving a same display panel.

9. The video data display device of claim 1, wherein the output data generation unit generates a status signal representing an operation status thereof and transmits the operation status to the status controller.

10. The video data display device of claim 1, wherein the data receivers of two of the driving circuits receive a same video data.

11. The video data display device of claim 1, further comprising a controller, coupled to the status controllers of each of the driving circuits, for receiving status signals generated by the status controllers.

12. The video data display device of claim 1, wherein the output data generation unit generates timing control signals utilized for driving the display panel.

13. The video data display device of claim 1, wherein the output generation unit generates timing signals of input data or output data thereof.

14. The video data display device of claim 1, wherein the data receiver converts an interface standard format of the video data.

* * * * *